United States Patent

Whitmore

Patent Number: 5,301,992
Date of Patent: Apr. 12, 1994

[54] CAR TRUNK CADDY

[76] Inventor: Henry B. Whitmore, Rte. 5, Box 369, San Antonio, Tex. 78221

[21] Appl. No.: 899,700

[22] Filed: Jun. 17, 1992

[51] Int. Cl.⁵ .................................. B60R 5/04
[52] U.S. Cl. ...................... 296/37.1; 224/42.42; 414/462; 296/26
[58] Field of Search .............. 296/26, 37.1, 37.2; 224/42.42; 414/462

[56] References Cited

U.S. PATENT DOCUMENTS

| | | | |
|---|---|---|---|
| 2,094,401 | 9/1937 | Girl | 414/462 |
| 2,188,548 | 1/1940 | Biszantz | 296/37.2 |
| 2,594,643 | 4/1952 | Gustisha | 296/37.1 X |
| 2,788,137 | 4/1957 | Harkness | 296/26 X |
| 2,953,287 | 9/1960 | Werner | 414/462 X |
| 4,725,183 | 2/1988 | Smillie, III | 296/37.1 X |
| 4,799,849 | 1/1989 | Miller | 414/462 |
| 4,941,797 | 7/1990 | Smillie, III | 414/462 |
| 4,969,793 | 11/1990 | Pawl | 414/462 |
| 5,054,578 | 10/1991 | Smillie, III et al. | 414/462 X |

OTHER PUBLICATIONS

Automotive Industries, Feb. 15, 1950, vol. 102, Issue 4, p. 33.

Primary Examiner—Dennis H. Pedder
Attorney, Agent, or Firm—Paul H. Gallagher

[57] ABSTRACT

A tray is positioned in the car trunk, mounted on extendible links, and movable from a lower position on the floor of the trunk to an upper position at the open top of the trunk. In the preferred form it is driven by the battery of the car, but as an alternate, may be hand powered. The tray has a tail gate that can be opened facilitating putting articles in and removing them from the tray. An alternate form includes a basket mounted on a platform and is extendable rearwardly out of the trunk when it is in its upper position.

7 Claims, 2 Drawing Sheets

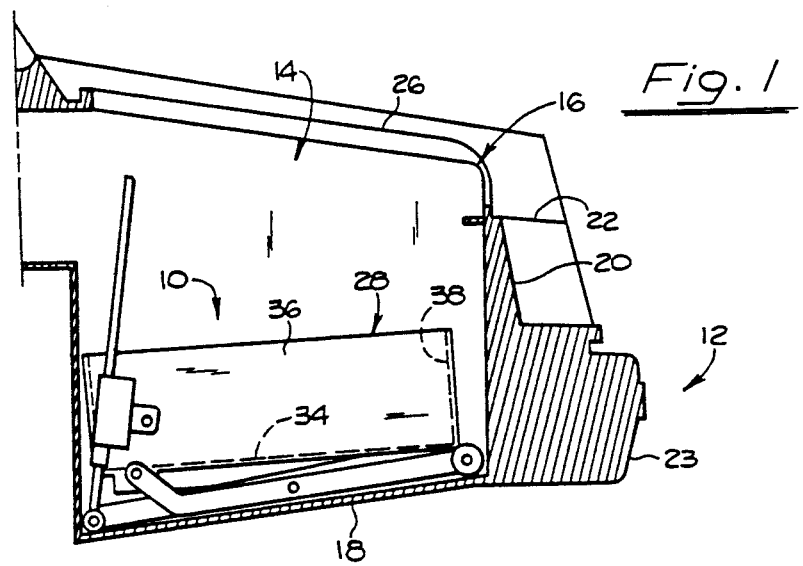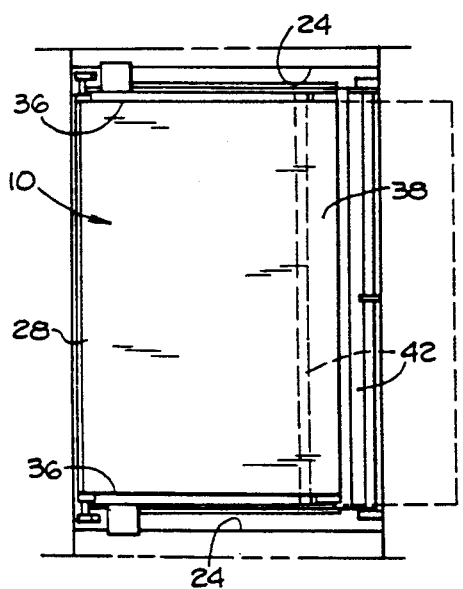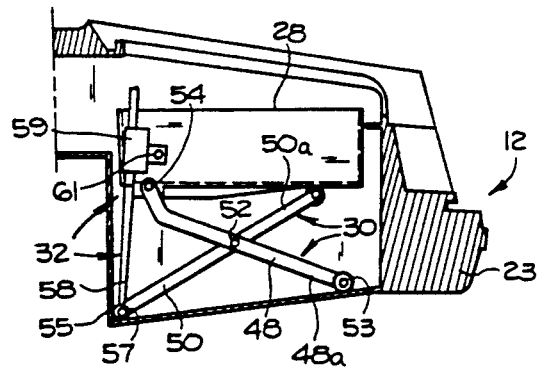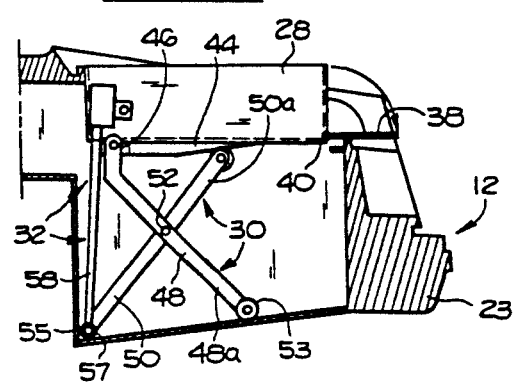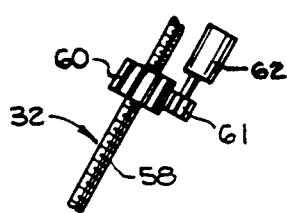

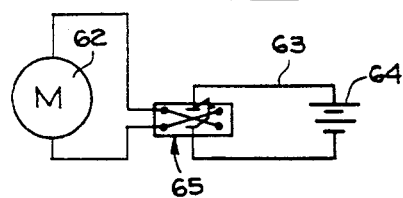
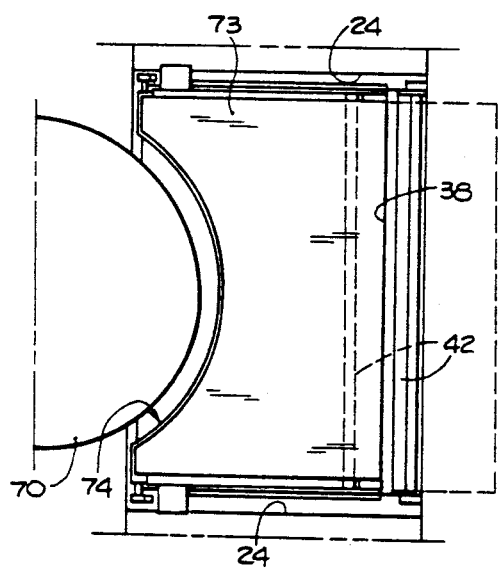
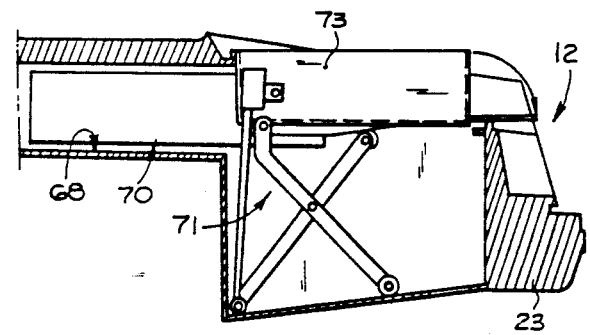
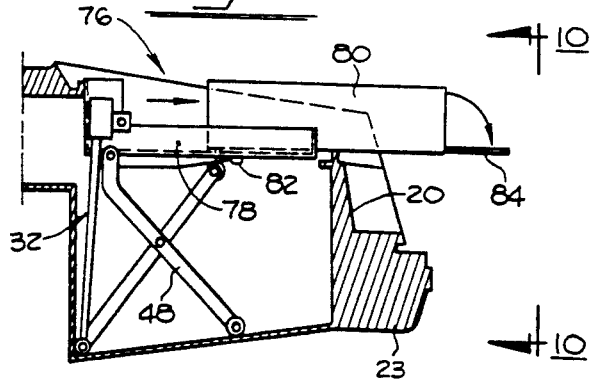
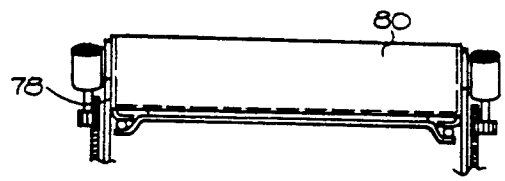

CAR TRUNK CADDY

BRIEF SUMMARY OF THE INVENTION

The invention resides in the field of automobiles, or cars, and more particularly having to do with the trunk in the rear of the car. Such trunks are in the form of cavities, or wells, and very often are deep, and the placement of articles into the trunk, and removing them therefrom, has been difficult, and in the case of deep trunks and heavy articles, the difficulty has been extreme.

A broad object of the invention is to provide a device, or caddy, to be put in the car trunk and assist the owner in handling the articles placed in and removed from the trunk.

Another and more specific object is to provide such a caddy having a tray or platform that is movable from a lower position at the bottom of the trunk, to an upper position at the open top of the trunk. The articles to be carried are placed in the tray, and when the tray is at the top, it facilitates placement of the articles therein, and then the tray is lowered in the trunk. Thereafter additional articles can be placed on the articles first placed. In removing the articles, the reverse steps are taken.

Another object is to provide such a device having the following features and advantages:

(a) the device may be powered by the car, i.e., by the battery in the car;

(b) the device, although placed in the trunk, diminishes the capacity of the trunk only slightly;

(c) the tray is of such construction and design, having a surrounding wall, such that it confines the articles therein against displacement sideways, and thus prevents the articles from sliding or shifting in the trunk. Although the tray has a surrounding wall, the wall includes a tailgate that can be lowered when the tray is in its upper position, to facilitate placement of the articles in the tray and removing them therefrom;

(d) the power means for raising and lowering the tray includes a mechanism that is slow moving, facilitating stopping the tray at any desired position in its vertical movements.

(e) in one form the tray when in raised position is extendible out of the trunk to the rear.

BRIEF DESCRIPTION OF THE SEVERAL VIEWS OF THE DRAWINGS

FIG. 1 is a side view, in vertical sections, of the trunk portion of a car, omitting certain details thereof.

FIG. 2 is a view taken from the top of FIG. 1.

FIG. 3 is a view similar to FIG. 1 but showing the tray in an intermediate position.

FIG. 4 is a view similar to FIGS. 1 and 3 showing the tray in a fully raised position.

FIG. 5 is a diagrammatic view of a fragment of the raising and lowering means.

FIG. 6 is an electrical circuit portion, used for raising and lowering the tray.

FIG. 7 is a view oriented according to FIG. 2 showing a slightly modified form, adapted for use in a trunk which also mounts a spare tire.

FIG. 8 is a side view of the arrangement of FIG. 7, oriented according to FIG. 1.

FIG. 9 is a view oriented according to FIG. 4, of a modified form, showing the tray extended rearwardly out of the trunk.

FIG. 10 is a view taken from the right of FIG. 9

DETAILED DESCRIPTION

Referring in detail to the drawings, FIG. 1 shows the caddy 10 of the invention, in the trunk of an automobile. The automobile is designated 12 and is very commonly referred to as a car and the rear end portion thereof is shown in the various figures, and includes the usual trunk 14. The trunk is a space, or cavity, or a well, and very often of deep dimensions, and may be referred to as a deep well.

The trunk opens upwardly as indicated at 16. The trunk construction includes a bottom element 18 and a rear wall 20, the latter having an upper edge 22 defining the opening of the trunk at that location, which will be of significance in connection with the upper position of the basket of the caddy, as described hereinbelow. The car includes a rear bumper 23, which very often, as it does in this case, extends a substantial distance beyond the rear wall 20, which is of significance, in connection with the device of the invention.

The trunk may be considered as having sidewalls 24 (FIG. 2) here indicated diagrammatically since those portions of the trunk may be open spaces. However the trunk structure that defines the opening 16 possesses upper edges, at 26 (FIG. 1) defining the practical side limits of the trunk, or well.

The caddy 10, which may also be referred to as a lifting mechanism, includes what may be referred to for convenience, as a tray 28, supporting means 30 including scissor links, and a jack 32.

The tray 28 may be in the form of a box or basket and includes a bottom element or board and a surrounding sidewall 36, the latter including a tailgate 38 (FIG. 4) extending across the rear of the tray and pivoted on a bottom horizontal axis 40. The tailgate 38 normally is in upright position, confining articles in the tray, but it may be moved down to a loading/unloading position as shown in FIG. 4.

The tray may be of any suitable mechanical construction, having for example reinforcing and stabilizing bars 42 (FIG. 2).

The tray is provided with ramps, inclines or inclined elements 44 at the side edges, and toward the front. These inclines increase in thickness in forward direction and they are for cooperation with the supporting means 30 in the vertical movements of the tray as referred to hereinbelow. At the sides of the tray, the sidewalls may be provided with lugs 46 if necessary or desired, for securing certain of the links of the supporting means 30.

The scissor links 30 include a pair at each side, those of each pair individually identified 48, 50 being pivoted together adjacent their midpoints as indicated at 52, and have free ends (FIG. 3) individually identified 48a, 50a, on which rollers 53 are mounted.

In each pair the link 48 is pivoted at its front end, at 54 on the sidewall of the tray, for example at the lug 46.

Each link 50 is pivotally mounted at its front end, at 55 in a bracket 57 fixed on the trunk floor 18, the front end thus being fixed in location. It will be understood of course that the links move in vertical planes, the axis 52 extending horizontal, transversely of the trunk.

The jack 32 is a representative form of mechanism for raising and lowering the tray. Any of various forms of device may be utilized, FIG. 5 showing such a representative form. A single jack, as indicated above, may be utilized, but if desired, a jack at each side may be used. Each jack includes a shank 58 pivoted at 55 in the bracket 57, with the link 50, and extends up into a motor component 59. The shank 58 is threaded and a nut 60 is threaded thereon, the nut having external gear teeth. A drive pinion 61 meshes with the nut 60 and is driven by an electric motor 62. The motor is incorporated in the component 59 (FIG. 3) it will also be noted that the component 59 is mounted on the sidewall of the tray at 61 on a transverse pivot axis. Other forms of jack may be utilized instead, if desired, such as Dayton brand linear actuators.

Preferably the jack 32 is operated by the power provided by the car in an arrangement represented in FIG. 6. In this figure the motor 62 is shown, connected in a circuit 63 which also includes the usual battery 64 of the car. A reversing switch 65 of known type is utilized for reversing the motor for raising and lowering the tray 28, and for stopping it in a selected position. It is to be understood of course that other means or mechanisms may be utilized such as a hand operated device. The trunk shown in FIGS. 1–4 indicates a bare or open space, but many cars are equipped with a spare tire mounted in the trunk. Attention is directed to FIGS. 7 and 8 for an arrangement in which the spare tire is so stored. In these figures leading from the upper portion of the trunk proper, is a cell 68 in which the spare tire 70 is mounted. In such cases the spare tire usually extends into the trunk space itself as indicated at 71, and to accommodate such an arrangement, the tray of the present device indicated at 73 has a concave front surface 74 (FIG. 7). This concave surface accommodates the spare tire and receives it therein, and except for that difference in shape, the construction and its operation are the same as or similar to that described above in connection with the first form.

In the operation of the caddy, a position is first assumed at the bottom of the trunk. In such position, the links 30 are collapsed, and lie nearly in parallel relationship. The links are stably mounted, the links 50 being fixed in location at 57, as noted, and the free ends 48a of the other links constantly engage the floor of the trunk. It will be understood of course that the arrangement is the same on both sides.

To raise the tray, the motor 62 is driven, which turns the nut 60 (FIG. 5) on the shank and thus raising the component 59 which, being connected with the tray, raises the tray. The tray lifts the front ends of the links 48, and the latter acting through the pivot 52 raises the links 50, the latter links then being raised at their rear ends. Thus the rear ends of both links 48, 50 are spread, i.e., vertically, and the tray is lifted positively at both front and rear, on both sides.

The shape of the tray, and the specific dimensions and arrangement of the links 30 may be as desired to accommodate the various shapes and constructions of trunk. In the present case the bottom element 18 of the trunk slopes downwardly in forward direction, and thus the tray slopes similarly when in lowered position. It is desired that the tray in its raised position not slope downwardly in forward direction, but preferably be horizontal, and it may even be desired to have it slope downwardly in rearward direction. For this purpose the inclines 44 are provided, on which the rollers 53 on the links 50 ride, the inclines increasing in depth in forward direction having the effect of relatively raising the front end of the tray. These inclines are predesigned to provide any of various positions of the tray.

Another advantageous feature of the invention is, as represented in FIG. 9, that the tray is extendible rearwardly out of the trunk. Although the tray is positionable at the top of the trunk, as a convenience in loading and unloading, the bumper 23 often projects quite a distance beyond the rear wall 20 of the trunk, and sometimes renders it difficult for a person to reach into the trunk. The construction of FIGS. 9 and 10 overcomes this difficulty. In this construction, the tray 76, is made up of a platform 78, and a basket or tray proper 80. The platform may be of any suitable construction, preferably of low profile on which the basket is mounted. The platform is mounted directly to the links 48 and the jack 32, as in the first form, and the basket is slidable on the platform, in a known and suitable construction. Stops or hooks 82 are mounted on the basket, which engage suitable elements on the platform, limiting the rear movements of the tray, and holding it from tilting back. In the upper position of the tray, the basket is slidable rearwardly over the rear wall, out of the trunk. In its outer position the tailgate 84 can also be lowered. Thus the tray extends beyond the bumper.

The caddy is very easily and simply put in position. It is mounted in the fixed brackets 57 (FIG. 3) on the trunk bottom element, and otherwise is free of positive connection with the car or any part of the construction defining the trunk. The caddy may of course be built in with the manufacture of the car, or it may be retrofitted as desired. The brackets 57 constituting the sole means of fixedly mounting the caddy, provide great simplicity in retrofitting the device.

The construction of the supporting means, constituted by the links 30 is also of very simple design. The tray is positively connected with other parts of the caddy only through the front ends of the links 48, and the jack 32. The tray is held in very secure and stable position by this very simple construction.

When the tray is loaded, the surrounding sidewall confines the articles therein against shifting or sliding, or displacement horizontally.

The tray may be positioned at any of various heights. The threaded shaft 58 (FIG. 5) constitutes a drawing element and because of the low pitch design, the tray can easily be moved to and stopped at any position in its range of movement. An example of this advantage is that if the articles to be carried more than fill the tray, the tray may be lowered in steps and at each position, it is a simple matter to place additional articles on the articles first placed. This is continued until the trunk is lowered sufficiently to easily place all of the articles, and if it is not then at the bottom, to lower it to its lowermost position on the floor. Reverse steps are taken in unloading.

In the loading and unloading steps, the advantage of the tailgate 38 will be appreciated, i.e., this enables articles to be moved directly horizontally through the rear of the tray, and would not be required to lift them over the rear wall (tailgate) of the tray.

I claim:

1. A caddy for retrofitting in a car trunk having a bottom element, a front end, a rear end, and a generally open top, said caddy comprising, a tray in the trunk and extending generally horizontally, supporting means under and supporting the tray, and including a pair of scissor links at each of two lateral sides of the tray, extendible and contractible vertically for moving the tray vertically between upper and lower positions, one link of each pair having one end pivotally secured to the bottom element of the trunk, and the other link of each pair having one end pivotally connected to the tray at the front end of the tray, and the other ends of the links being slidable along the tray and bottom element respectively, means for extending and contracting the links, including an upright rotatable threaded shaft connected to the bottom element and extending to the tray, and means on the tray cooperable with the threaded shaft for moving the tray vertically.

2. A caddy according to claim 1 for use in a car having a battery and wherein, the caddy includes power means operated by the car battery.

3. A caddy according to claim 1 for use in a car trunk having an open top, and a rear wall at the rear end determining the rear margin of the open top, wherein, the tray includes a bottom element and a surrounding wall, the surrounding wall including a tailgate at a rear side, and in said upper position, the bottom element of the tray is closely adjacent an upper edge of the rear wall and the tailgate of the tray is swingable down into a position over the rear wall and extending rearwardly.

4. A caddy according to claim 3 wherein, the tray has inclines engageable by free ends of the respective one links, and the inclines being of predetermined slope to predetermine the resulting slope of the tray.

5. A caddy according to claim 1 wherein the car includes a space communicating with and leading forwardly from a space in the trunk for mounting a spare tire therein, said spare tire when so mounted also extending rearwardly into the space of the trunk, wherein, the tray has a concave forward surface shaped complementally to the tire, to enable the tray to be moved vertically in the trunk with clearance relative to the tire.

6. A caddy according to claim 1 wherein, the tray includes a platform and a basket thereon functioning together as a unit, the basket is movable forwardly and rearwardly on the platform, the basket having a retracted position on the platform wherein these two members together are movable vertically as a unit in the trunk, and the basket is capable, when the tray is in said upper position, of being moved rearwardly on the platform over said back wall to a position exterior of the trunk.

7. A caddy according to claim 6 for use in a car having rear bumper extending rearwardly from and below said back wall, and wherein, the basket includes a tailgate movable between an upper confining position, and a down open position when the basket is its said exterior position.

* * * * *